June 24, 1969     J. H. HERRERA     3,451,329
BREWING APPARATUS
Filed Dec. 14, 1967
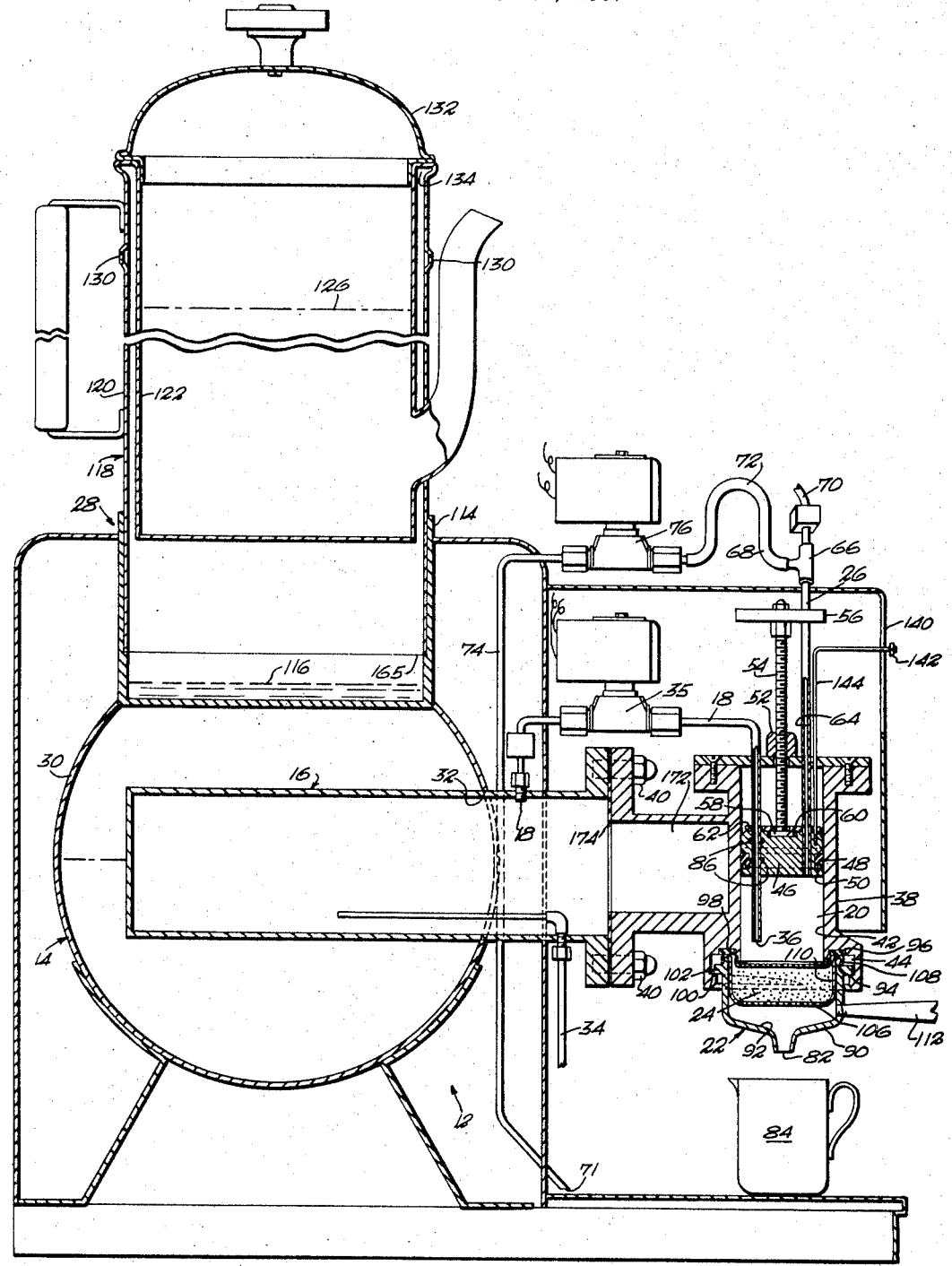
INVENTOR.
JUAN HERNANDEZ HERRERA
BY *John Cyril Malloy*
ATTORNEY.

# United States Patent Office 3,451,329
Patented June 24, 1969

3,451,329
BREWING APPARATUS
Juan Hernandez Herrera, 3647 SW. 24th St.,
Miami, Fla. 33145
Filed Dec. 14, 1967, Ser. No. 690,479
Int. Cl. A47t 31/10, 31/00
U.S. Cl. 99—290          5 Claims

ABSTRACT OF THE DISCLOSURE

An improved brewing apparatus which includes a heater to heat a supply of water and a variable sized brewing chamber for selectively brewing a predetermined amount of liquid; the brewing tank is in open communication with the heat source so as to maintain the brew chamber at a substantially elevated temperature during the brewing operation without heat loss.

---

This invention relates to apparatus for brewing coffee, and, more particularly, to an improved brewing apparatus.

It is an object of this invention to provide an improved coffee brewing apparatus which includes a variable sized brewing tank into which a predetermined amount of water is adapted to be flowed to displace air trapped therein and, thereafter, the water which is captivated within the brew chamber is adapted to be forced through a batch of infusion material by air pressure which is flowed into the chamber to cause the heated water to pass through the infusion material to be brewed and supply a predetermined amount of coffee.

It is another object of this invention to provide an improved coffee making apparatus which provides for the brewing of a predetermined amount of coffee without heat loss, the brewing taking place at an elevated temperature by reason of structure which places the walls of the brew chamber in communication with the heat source for the apparatus.

It is another object of this invention to provide an improved coffee making apparatus which includes auxiliary heater means for maintaining milk or cream at a relatively elevated temperature so as to cause the cream or milk to be poured into the hot coffee or other brewed materials.

It is another object of this invention to provide an improved coffee brewing apparatus which is simple in construction, inexpensive to manufacture, and is well adapted for the purposes intended.

In accordance with these and other objects which will become apparent hereinafter, the instant invention will now be described with reference to the accompanying drawings in which:

FIGURE 1 is a view in cross section which illustrates the details of the instant invention.

Referring to the drawings, wherein like reference characters designate like or corresponding parts throughout the different views, and referring particularly to FIGURE 1, there is shown what has been generally designated by the numeral 12 a coffee brewing apparatus which includes a boiler or heater portion 14 to heat water in a hot water tank 16 supported in heat exchanging relation in the boiler portion or heater to provide for delivery of hot water through conduits 18 which lead to a variable size brew tank 20 from which it is adapted to be dispensed by a dispensing means 22, after passage through a batch of infusion material 24. An evacuation system 26 is provided to accommodate for the air displaced by the incoming heated water in the brewing tank. In addition, an auxiliary heater means 28 is provided in heat exchanging relation with the heater for heating a supply of milk or the like, as will be explained hereinafter.

Referring more particularly to the coffee brewing apparatus, it is seen that the boiler or heater 14 may comprise a tank 30 which is supplied with heat from any suitable source (not shown) to heat water in the tank 16 which is inserted therein through the opening 32 which is suitably lined or insulated to retain heat. The water in the tank 16 is charged thereinto through an inlet pipe 34 under the line pressure of the supply source, and upon being heated passed through the line 18 past a valve 35 when it is open, for entrance through the end of the tube 36 which is located in the lower portion of the brew chamber of the brew tank 20. The brew tank 20 is composed of a housing 38 suitably fastened as by the bolts 40 to the device, as shown, to the water tank, and includes a cylindrical wall 42 with a lower entrance mouth 44 to be described hereinafter and a movable roof member 46. The movable roof member is sized for snug axial movement in the cylinder bore and includes sealing means 48 in an annular peripheral seat 50; the roof member is adapted to be raised and lowered by an operator or screw 54 which is threadably passed into the bore through a threaded bore of a collar 52, the screw 54 being operable exteriorly of the cylinder by an operator handle 56. It will be seen that manipulation of the operator 56 will cause the screw to travel and the carried planar head plate 58, by reason of this captured position within a slot 60 of the roof, will cause axial movement of translation of the resultant piston or movable roof member so as to vary the size of the chamber of the brewing tank 20. The tube 18, it will be seen, passes through a bore 62 which is provided in the slidable roof member and which is in parallel relation to the axis of the cylinder so as not to interfere with reciprocal movement of the piston head. Also, an evacuation tube 64 is provided in similar parallel relation; it passes through the aforesaid slidable piston or roof 46 also. This latter tube 64 is for the evacuation of air which is displaced from the dispensing chamber on the entrance of heated water thereinto. Referring to the evacuation tube 64, it will be seen that through a T-joint 66 it is in series with parallel paths 68 and 70; one of the parallel paths leads to a discharge port 71 through hose lengths 72 and 74 intermediate of which there is provided a valve member 76.

The operation of the device will be understood on reference to FIGURE 1 wherein it is seen that heated water passing through the system 18 into the chamber 20 will displace the air for passage through the evacuation system 64 and through the tubes 72 and 74 to the discharge point 71. This will take place so long as the aforesaid valves 35 in the line 18 and the valve 76 in the line 72, 74 are operated simultaneously and are in the open position. For this reason, the valves 35 and 76 are termed dual or twin valves. When the volume of the brewing chamber has been filled with the hot water, the valves 35 and 76 are closed to prohibit further entrance of water and the evacuation passage of air through the valve 76. Thereupon, the other path 70, which is in parallel with that path 72, is provided with a compressed air pressure to produce forces which cause the water which is trapped in the brewing chamber to be forced by the closing of the valves downwardly passing through the coffee grounds 24 and out the mouth 82 to be collected in a cup 84. It will be noted that by reason of the variation in the height of the roof member the hose length 72 is flexible as an arm within the limited range required to accommodate and permit such movement relative to the stationary valve 76. Circumposed about the tube 18 sealing means 86 are provided as required.

Referring to the dispensing means 22, it will be seen that this comprises a body portion 90 having an inner cavity 92 bounded at the upper end by a lip 94 which is sized to nest against a seal 96 in an annular recess 98 in the lower portion of the cylinder wall and to be supported thereby a shoulder 100 with the lip snugly sealing against the gasket 96 and held in position following a turning advancement by the flange 102 which dwells on and securely holds the body in the position shown in FIGURE 1. Within the body cavity there is suspended a strainer member 106 which has a lip 108 curved arcuately so as to snap engage the lip of the body. The strainer material is adapted to hold in the lower portion 110 thereof a predetermined size or charge of coffee, such as a charge sufficient for brewing a single cup of coffee or any designated plurality of cups of coffee. Suitable handle means 112 are provided for manipulation of the body in the cylinder recess.

Referring to the upper left of FIGURE 1, the auxiliary container is provided. It will be seen that this includes a jacket 114 in the bottom of which there is provided in use a layer of water 116 to be heated. Within the jacket there is disposed a double-walled container 118 which includes an open bottomed 165 outer surface 120 and an inner container suspended therein 122. In use, the water 116 is heated in the lower portion of the member 114 and rises as steam between the inner and outer walls 120 and 122 of the unit. If a cold supply of liquid, such as milk 126, is disposed within the inner chamber, the heated steam on contacting the inner wall 122 will cause a condensation which in turn will flow down and drip back to the bottom of the container 114. However, once the liquid in the inner chamber has reached a certain elevated temperature, the moisture in the steam will no longer condense and the steam will rise and be exhausted through the ports 130 which are provided. A cap 132 is provided which nests within the mouth of the container 122 bridging the cavity 134 between the inner and outer chamber in the event that it is not closed as shown.

Referring now to the operation of the coffee brewing apparatus in chief, the amount of water which is charged into the variable size brewing chamber is determined by the length of time that the solenoid valves 35 and 76 are open, and this in turn is timed so as to flow a predetermined amount of water which is equal to the amount required to brew the volume required to fill the size of cup or cups 84 to be filled.

For use in measuring the variable size of the brewing chamber, indicator means are provided comprising a reference sheet 140 secured on the exterior surface and including gradation marks therealong. With reference thereto, a movable pointer 142 is provided, the pointer being connected for movement with the roof member through a leg 144. It is thus seen that the position of the pointer 142 with reference to the scale or reference 140 comprises an indicator which determines or reflects the size of the brewing chamber since it is directly related to and keyed to the position of the variable roof member.

As an important improvement of this invention, it is to be noted that the cylinder surrounding the brewing chamber is maintained in an elevated temperature so that the coffee can be made with hot water which does not lose its heat in traveling through the brewing chamber. This is accomplished by means of a water jacket 172 which is arranged in surrounding relation of the central portion of the cylinder wall and which is recessed so that the brew chamber walls are in open communication with the main body of the heat tank 16 as is indicated by the entrance thereinto at 174. This latter structure provides for the provision of hot water at the temperature desired and for a more positive control of the temperature of the water at which the brewing takes place.

While the instant invention has been shown and described herein in what is conceived to be the most practical and preferred embodiment, it is recognized that departures may be made therefrom within the scope of the invention, which is, therefore, not to be limited to the details disclosed herein, but is to be accorded the full scope of the claims so as to embrace any and all equivalent apparatus and articles.

What is claimed is:

1. A coffee brewing apparatus including: a storage tank for water to be heated, heater means for heating the water in the storage tank, a brewing container comprising a cylindrically walled housing having a movable piston type roof member slidable therein and an exit port, said exit port being at all times on one side of said movable roof member, and a dispensing means in spanning relation of the exit port, and an operator for said variable roof member, said operator member being at all times accessible exterior of said brew chamber, conduit means interconnecting the storage tank and the interior of the brew chamber, said conduit means including metering means intermediate the length thereof, a conduit system at all times in fluid communication with the interior of said brew chamber where brewing actually takes place, said conduit system including interconnected tubular members arranged in parallel, with said tubular members being in series with a length interconnecting with said brew chamber, one of said tubular members having an exit port at one end and a valve intermediate the length thereof, the other of said tubular members being interconnected to a source of compressed gaseous medium, whereby when fluid which is hot is allowed to flow through said first mentioned valve into said brewing chamber, the valve in the tubular member is also open so that the air displaced by the inflowing fluid may be evacuated until both of said valves are closed and, thereafter, the gaseous medium under pressure will force the heated liquid through the dispensing means, said roof member being adapted to vary the interior operable volume of the brew tank.

2. The improvement as set forth in claim 1 wherein said brew tank is in communication with said heated liquid.

3. The improvement as set forth in claim 1 wherein auxiliary heating means are provided to heat a supply of cream for use with the brewing material.

4. The improvement as set forth in claim 1 wherein said dispensing means includes a screen member defining a pocket for receiving a charge of infusion material and a carrier arranged and constructed for inter-mating relation with a lip about said exit port for positioning of the screen means so that water flowed through the brewing chamber will be constrained to passage through the infusion material.

5. The improvement as set forth in claim 1 wherein an auxiliary heating unit is provided which includes a heating tank for milk or cream and the heating tank includes a double walled unit with a cup-shaped member suspended within an outer open bottomed sleeve, said open bottomed sleeve being snugly received within said heat chamber.

References Cited

UNITED STATES PATENTS

| 2,205,290 | 6/1940 | Herrera | 99—302 |
| 2,688,911 | 9/1954 | Hochmayr | 99—302 |
| 2,881,692 | 4/1959 | Volcov | 99—300 |

ROBERT W. JENKINS, *Primary Examiner.*

U.S. Cl. X.R.

99—302